United States Patent [19]

Kolling, Jr.

[11] 4,273,957
[45] Jun. 16, 1981

[54] TELECOMMUNICATIONS ACCESS APPARATUS

[76] Inventor: William J. Kolling, Jr., 3059 N. Olcott, Chicago, Ill. 60635

[21] Appl. No.: 45,996

[22] Filed: Jun. 6, 1979

[51] Int. Cl.³ .............................................. H04M 1/00
[52] U.S. Cl. ................... 179/1 PC; 179/98; 339/122 R; 339/123; 174/53; 174/55
[58] Field of Search .................... 179/1 PC, 91 R; 339/119 C, 122 R, 123, 126 R, 150 T, 156 R, 166 R, 177 R, 186 R, 186 M, 193 R, 211; 174/53, 55, 56, 58, 59

[56] References Cited

U.S. PATENT DOCUMENTS

| | | | |
|---|---|---|---|
| 1,835,478 | 12/1931 | Eaton | 174/53 |
| 1,904,670 | 4/1933 | MacFadden | 174/53 |
| 1,933,358 | 10/1933 | Almcrantz | 174/53 |
| 1,938,309 | 12/1933 | Williams | 174/55 |
| 2,114,258 | 4/1938 | Tornblom | 174/67 |
| 2,828,394 | 3/1958 | Mayzik | 174/55 |
| 2,997,520 | 8/1961 | Kinsman | 174/67 |
| 3,609,647 | 9/1971 | Castellano | 174/53 |
| 3,619,476 | 11/1971 | Rasmussen | 174/53 |
| 3,814,834 | 6/1974 | Glader | 174/57 |
| 3,885,852 | 5/1975 | Grove | 339/122 R |
| 4,066,838 | 1/1978 | Fujita et al. | 174/53 |
| 4,165,443 | 8/1979 | Figart et al. | 339/150 T |
| 4,166,934 | 9/1979 | Marrero | 174/55 |

Primary Examiner—Gerald L. Brigance
Attorney, Agent, or Firm—Hill, Van Santen, Steadman, Chiara & Simpson

[57] ABSTRACT

A modular communications access apparatus which permits untrained personnel to quickly and properly convert a passive junction box which contains a telecommunications cable to an active junction box with a wall-mounted telecommunications socket, includes a first keyed socket connected to selected conductors of the in-wall telecommunications cable and an associated attachment structure. The attachment structure, designed to be connected by the untrained personnel, includes an active face plate having a centrally located and an outwardly oriented telecommunications socket, an electrical connection means affixed to an inner side of the face plate and plug engageable with the keyed socket affixed to the telecommunications cable as well as an attachment means to retain the attachment structure adjacent the junction box when the installation is completed.

19 Claims, 11 Drawing Figures

TELECOMMUNICATIONS ACCESS APPARATUS

BACKGROUND OF THE INVENTION

1. Field of the Invention

The invention pertains to the field of communications connection devices.

2. The Prior Art

It has been the practice of communications providers, such as telephone companies, to provide in-wall wiring for customers when so requested. The in-wall wiring includes the actual telecommunications cable as well as selectively located junction boxes through which the telecommunications cable passes. The in-wall wiring phase is completed during the building construction prior to the application and finishing of the wallboard. After the wallboard has been applied and finished, including painting, the communications services provider returns and at those junction boxes which the customer has decided to have activated, the service representative mechanically affixes a telecommunications socket to the in-wall telecommunications cable. The telecommunications cable socket is mounted on an outwardly oriented surface of a face plate which is then connected to the junction box for mechanical rigidity and stability. For those junction boxes which the customer has initially decided not to activate, a passive face plate is provided which merely closes off in a cosmetically acceptable fashion the service aperture to the junction box located behind the wallboard. Subsequently, if the customer decides to activate any of the passive junction boxes, a return visit by the service representative is necessary. On this return visit the service representation removes the passive wall plate, and installs an active wall plate including the outwardly oriented telecommunications socket of the type previously discussed.

The connection between the standard telecommunications sockets of the type previously discussed is conventionally a screw-type connection which requires the service representative to mechanically break into the multi-conductor telecommunications cable, select the desired ones of the conductors within that cable, mechanically remove the installation from those selected conductors, and then affix the selected bare conductors under the screw-type terminals and screw the terminals down to achieve proper electrical conductivity between the socket and the telecommunications cable. This process is expensive in terms of the labor, because at least two visits are required to install and activate the telecommunications system. A first visit is required to install the telecommunications cable and the junction boxes in the wall behind the wallboard. At least one more visit is subsequently necessary wherein the service representative returns and activates those junction boxes, as described above, that the customer initially wants to have activated. Additionally, if the customer subsequently wishes to activate more junction boxes or de-activate some of the junction boxes, another service call is required by a trained representative of the communications company.

In pre-fabricated wall construction it is, of course, not possible to install the telecommunications cable in junction boxes when the walls that are received at the construction site, but they must be installed during the manufacturing process. No satisfactory solution exists at the present time to the problem of pre-wiring pre-fabricated building structures, in that, among other reasons, the communications company is not part of the manufacturing process and as such is not available during the manufacturing cycle for the installation of the telecommunications cable in the pre-fabricated wall members.

Thus, there is an unsolved need for a system and apparatus whereby in conventional construction return visits by the trained service representative might be completely eliminated by enabling the customer to, in a foolproof fashion and without training, activate or de-activate selected junction boxes which have been installed and wired with cable during the construction phases. In the pre-fabricated building market there is also a need for a system and apparatus whereby telecommunications cable might be installed in the pre-fabricated building members during the manufacturing phase and then shipped on an interstate basis throughout the country and such that subsequently selected junction boxes within the pre-wired pre-fabricated wall structures could be quickly and easily activated by either the local telecommunications company representative or personnel involved in erection of the pre-fabricated structure without requring those personnel to receive any significant degree of training.

SUMMARY OF THE INVENTION

A modular telecommunications access apparatus is provided which permits untrained personnel to easily and in a foolproof fashion activate pre-wired communications junction boxes, which have a telecommunications cable therein, by plug connecting an attachment structure to a socket attached to the telecommunications cable which is located within the selected junction box.

The attachment structure has a face plate of a selected shape and size with an outwardly oriented telecommunications socket usually located in a central region of an outwardly oriented surface of the face plate. On the rear side of the face plate is a plug either rigidly connected to the outwardly oriented telecommunications socket or connected to that socket by means of a short multi-conductor wire. Additionally, attached to an inwardly oriented side of the face plate is an attachment means usually consisting of a pair of spring-biased arm members which will engage an interior surface of the junction box mounted in the wall so as to hold the face plate adjacent the front surface of the wall once it has been installed.

These arm members might consist of a pair of elongated metal strips which are clamped to the interior surface of the face plate or they might consist of a pair of arms which are an integral part of the face plate and which are molded to the interior surface to the face plate and which have either a toothed surface to engage the junction box or which are bent slightly outwardly so as to press against an interior surface of the junction box thereby holding the face plate adjacent the junction box.

The socket affixed to the telecommunications cable within the junction box has a physical configuration, including the socket terminations and their orientation, which could be different from the outwardly oriented telecommunications socket on the front surface of the face plate so that it is necessary to install an attachment structure as described herein to activate the junction box.

Because the plug associated with the attachment structure is keyed and may be inserted into the socket associated with the telecommunications cable in only one way, the installation of the attachment structure is substantially foolproof and may be carried out by personnel which has little or no training in connecting telecommunications equipment and without any tools.

DETAILED DESCRIPTION OF THE PREFERRED EMBODIMENTS

Not by way of limitation, but by way of disclosing the best mode of practicing my invention and by way of enabling one of ordinary skill to practice my invention, there are disclosed in FIGS. 1 through 11 several alternate exemplary embodiments of my invention.

Figures 1, 2, 3, 4, 5:
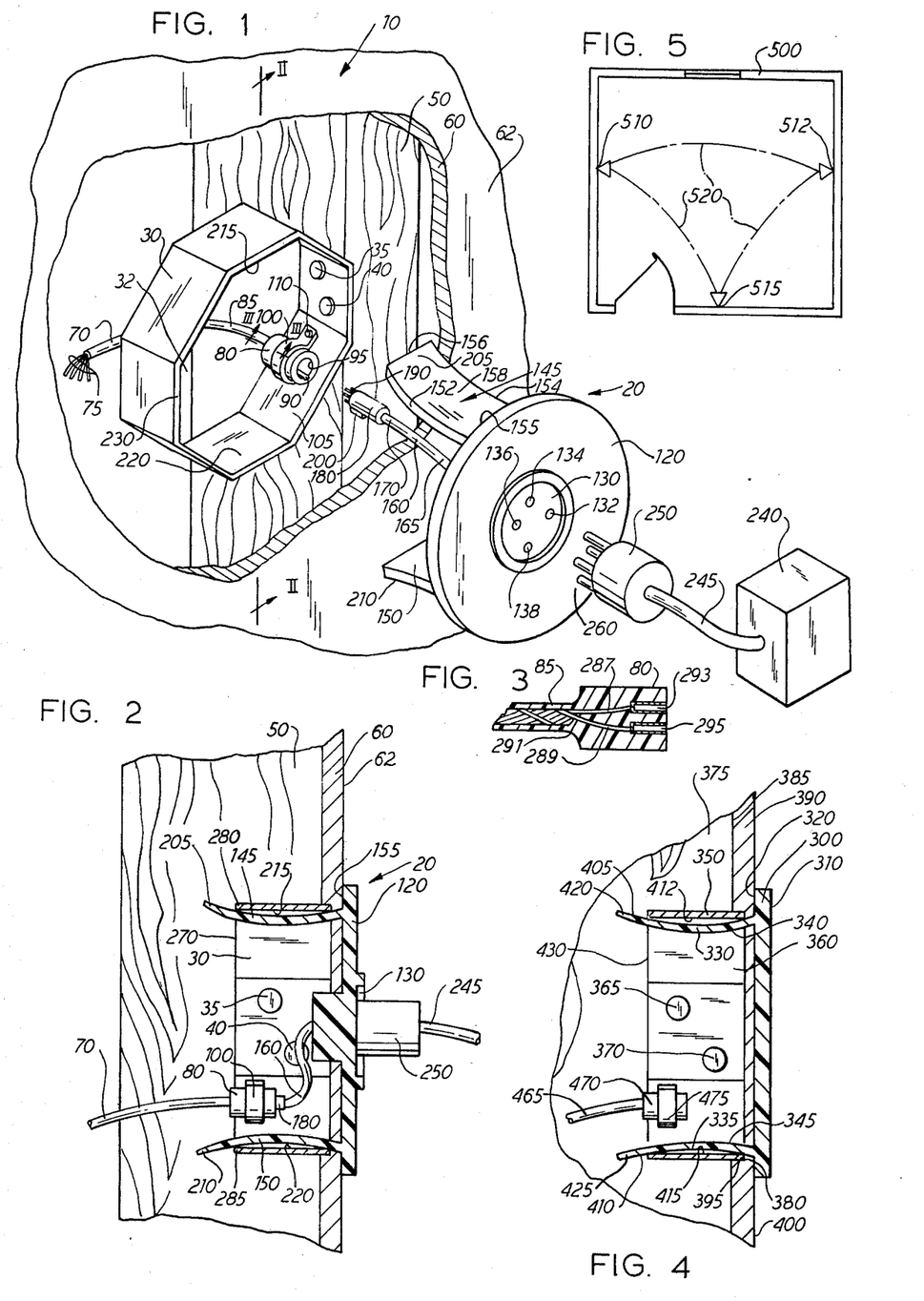
FIG. 1 is perspective view, with a portion of the wallboard broken away, of the wall-mounted junction box and the attachment structure of the present invention.
FIG. 2, a section taken along line II—II of FIG. 1 shows the innterrelationship between the attachment structure, the wall, and the junction box.
FIG. 3, an enlarged section taken along the line III—III of FIG. 1 shows the detail of the junction box socket.
FIG. 4 is a section showing the relationship between a passive face plate, the wallboard, and the junction box.
FIG. 5 is a planar top view of a room containing a plurality of junction boxes connected by in-wall wiring.

FIG. 1 discloses an exemplary modular telecommunications access apparatus 10 having a telecommunications attachment structure 20 which provides quick access to a junction box 30 with an access aperture 32. The box 30, shown for exemplary purposes as an eight-sided structure attached by a pair of nails 35, 40 to a wall member 50 at an appropriate depth with respect to a piece of overlying wallboard 60, may have any desired shape. The wallboard 60 has a front planar surface 62. A telecommunications cable 70 having a selected number of conductors 75, is brought to the junction box 30 during an installation phase. The cable 70 terminates in a keyed socket 80 affixed to an end 85 of a cable 70. The keyed socket 80 may be molded to the end 85 of the cable 70, or otherwise attached in any conventional fashion and has a plurality of socket terminations of a selected size and shape.

The exemplary socket 80 has a key slot 90 selectively located on an interior boring 95 of the socket 80. At the base of the socket 80, adjacent the interior bore 95, as is conventional, is the plurality of socket terminations, one termination corresponding to each member of the selected group of conductors 75. A circular clamp 100 receives the socket 80 for the purpose of clamping the socket 80 rigidly to a side member 105 of the box 30. The clamp 100 is attached to a side member 105 of the box 30 by a screw or rivet 110.

The telecommunications attachment structure 20 has an active face-plate 120 with an outwardly oriented, low power, telecommunications socket 130 located in a central region thereof. For exemplary purposes the socket 130 includes a set of four socket terminations 132, 134, 136 and 138. The socket terminations 132 through 138 are selectively located on the front of the socket 130. The set of socket terminations 132-138 has a selected size and shape different from the plurality of socket terminations associated with the socket 80.

A pair of friction retaining members 145, 150 are moldingly attached to a rear surface 155 of the face plate 120 and provide a means to retain the telecommunications attachment structure 20 adjacent the box 30. Each of the retaining members 145, 150 is identical and a description of the element 145 will also describe the member 150. The member 145 has a pair of elongated parallel sides 152, 154 with an end 156. The member 145 has a generally concave top surface 158. The concave shape of the member 145 provides the mechanism whereby the attachment structure 20 is held adjacent the aperture 32 of the junction box 30.

A low-power communications wire 160 has a first end 165 which is operatively attached to the socket 130. The wire 160 has a selected number of conductors, each of which is operatively connected to the socket terminations 132 through 138 of the socket 130. The cable 160 has a second end 170 which is attached to a keyed plug 180 having a plurality of plug terminations 190. Each of the members of the plurality of pin terminations 190 is in electrical contact with one of the conductors of the cable 160 and in electrical contact with one member of the plurality of socket terminations 132 through 138 of the telecommunications socket 130. The plug 180 has a selectively oriented elongated key 200.

The plug 180 is selected to mate with the socket 80 such that the key 200 of the plug 180 will engage the key way 90 of the socket 80. Further, the plug terminations 190 of the plug 180 are designed to engage the socket terminations at the base of the bore 95 of the plug 80. When the plug 180 is connected to the socket 80, the plurality of socket terminations 132 through 138 of the telecommunications socket 130 is connected to the selected number of conductors 75 of the telecommunications wire 70 brought to the junction box 30.

The retaining members 145, 150 attached to the face plate 120 may be slightly compressed so that their respective ends 205, 210 will slide within a pair of surfaces 215, 220, respectively, of the box 30. Because the retaining members 145, 150 are each designed to have an upwardly concave surface such as the surface 158 and hence have a limited amount of spring bias, the members 145, 150 tend to push outwardly toward the surfaces 215, 220 of the box 30 thereby retaining the face plate 120 of the telecommunications access device 20 substantially adjacent a front edge 230 of the box 30.

A selected telecommunications device 240 having an appropriate telecommunications cable 245 and an appropriate telecommunications plug 250, may be connected to the telecommunications cable 70 by inserting a plurality of pins 260 associated with the plug 250 into the plurality of socket terminations 132 through 138 of the socket member 130.

Thus, the telecommunications attachment device 20 provides an inexpensive, convenient and fast way whereby the active telecommunications socket 130 may be connected to an available telecommunications cable 70. While the embodiment of FIG. 1 of my invention has been described in terms of telecommunications cables and sockets, it will be understood that my communications access apparatus is equally applicable to any low-power communications system where it is desirable to provide foolproof, quick, access to a telecommunications cable, such as the cable 70 without the need to use tools, and by essentially unskilled personnel.

FIG. 2, a section taken along line II—II of FIG. 1, shows the telecommunications attachment structure 20 in use. The plug 250 has been connected to the telecommunications surface socket 130. The face plate 120 with the attached communications wire 160 has been connected to the wire 70 by inserting the keyed plug 180 into the keyed socket 80 retained by the clamp 100 within the box 30. The two ends, 205, 210 of the retaining members 145, 150 have been located adjacent the two interior surfaces 215, 220 of the box 30 with the ends 205, 210 extending outwardly behind a rear edge 270 of the box 30. The outwardly oriented bias of the retaining members 145, 150 generates frictional forces at a region 280, 285 respectively, of the interior surfaces 215, 220 thereby tending to retain the rear surface 155 of the face plate structure 120 adjacent the front surface 62 of the wallboard 60. The frictional surfaces so generated against the regions 280, 285 are such that the plug 250 may be inserted into the socket 130 and removed without causing the telecommunications attachment structure 20 to move away from the telecommunications box 30.

FIG. 3, a section taken along line III—III of FIG. 1 shows the socket 80 molded to the end 85 of the cable 70. A selected pair of conductors 287, 289 from the cable 70 pass through a rear section 291 of the socket 80 and are electrically connected to a pair of socket terminations 293, 295, of a selected size and shape which are rigidly affixed to the socket 80.

FIG. 4 shows the use of a passive face plate 300 which has a size and shape corresponding to the active face plate 120. The passive face plate 300 has an exterior planar surface 310 and an inwardly facing parallel surface 320. A pair of retaining members 330, 335 are molded to the inwardly oriented surface 320 at a first end 340, 345, respectively. The retaining members 330, 335 have the same shape and characteristics as the retaining members 145, 150 associated with the active face plate 120. A wall mounted junction box 350 with an outwardly oriented surface aperture 360 has the same shape as the box 30 with the surface aperture 32. The box 350 is affixed by a pair of nails or screws 365, 370 to a wall member 375. A front edge 380 of the in-wall box 350 extends forward of a front edge 385 of the wall member 375. A piece of wallboard or such exterior covering 390 is located adjacent and in front of the wall member 375. The wallboard 390 has a lip 395 which is located adjacent and in front of the front edge 380 of the box 350. Thus, as can be seen in FIG. 4, the box 350 corresponding to the box 30 is attached to the wall member 375 and is recessed with respect to a front surface 400 of the wallboard 390.

The passive face place 300 is inserted into the inwall box 350 by bending the biased retaining members 330, 335 slightly inwardly so that a top concave surface 405, 410 of each retaining members 330, 335 is located adjacent corresponding interior surface 412, 415 of the box 350. The passive face plate 300 is then pushed toward the surface 400 of the wallboard 390 such that the interior surface 320 of the passive wall plate 300 is moved adjacent the front surface 400. When the interior surface 320 of the passive face plate 300 has been moved adjacent the front surface 400 of the wallboard 390, a pair of ends 420, 425 of the curved retaining members 330, 335 extend inwardly beyond an interior edge 430 of the box 350.

A telecommunications cable 465, corresponding to the cable 70, with an associated telecommunications socket 470 retained within the box 350 by a clamp 475 corresponding to the clamp 100 in the box 30 is available for access and use whenever the passive face plate 300 is removed from the box 350. Removal of the passive face plate 300 is accomplished by prying a portion of the interior surface 320 away from the front surface 400 of the wallboard 390 and then pulling the passive face plate 300 away from the front surface 400 of the wallboard 390. This pulling motion causes the curved retaining members 330, 335 to bend inwardly slightly as the ends 420, 425 of the retaining members 330, 335 move along the interior surfaces 412, 415 of the box 350.

Once the passive face plate 300 has been removed, the attachment structure 20 may be quickly and properly connected to the cable 465 via the socket 470 by untrained personnel. The junction box 350 has thus been converted from a passive state to an active one and a selected communications device may then access the cable 465.

FIG. 5, a typical room or office 500 shows a plurality of in-wall communications boxes 510, 512, 515 linked together by a multi-conductor in-wall communications cable 520. Each of the boxes 510 through 515 is an in-wall mounted junction box such as the boxes 30 or 350. A combination of communications attachment structures 20 and passive face plates 300 may be used in conjunction with the boxes 510 through 515 to provide desired communications to the telecommunications cable 520 which could then be connected into other communications facilitites. If one of the boxes 510 through 515 had been rendered a passive box by placing a passive face plate such as the face plate 300 thereon, all that would be necessary to convert that particular access point to an active access point would be to remove the passive face plate, such as the passive face plate 300 and replace it with an attachment structure such as the attachment structure 20 which plugs into the socket located within the selected wall-mounted junction box 510, 512 or 515.

Figure 6:
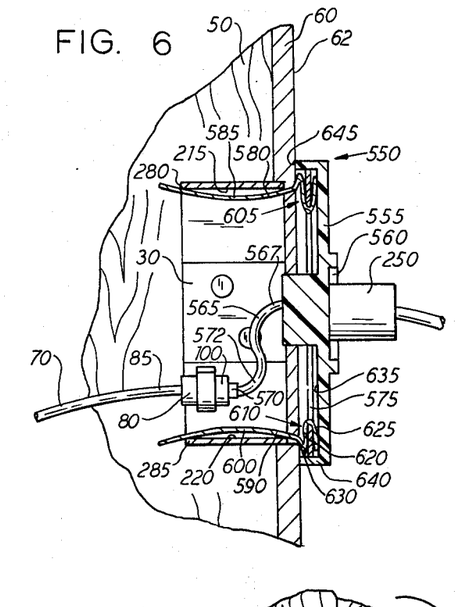
FIG. 6 is a section view showing the relationship between an alternate embodiment of the attachment structure, the wallboard and the junction box.

FIG. 6 is an alternate form 550 of the communications attachment device 20 of FIG. 1. The communications attachment device 550 has an active face plate 555 with a centrally located low-power communications socket 560 comparable to the centrally located low-power communications socket 130 centrally located in the active face plate 120 of FIG. 1. The plug 250 is shown in FIG. 6 plugged into the outwardly oriented low-power communications socket 560. A low-power multi-conductor communications wire 565 is connected at a first end 567 to the low-power communications socket 560 and to a keyed plug 570 at a second end 572. The plug 570 corresponds to the keyed plug 180 of FIG. 1. The socket 80 shown in FIG. 6 within the junction box 30 located behind the wallboard 60 is shown with the keyed plug 570 connected thereto completing the communications path between the plug 250 associated with the selected communications device and the end 85 of the telecommunications cable 70 which has been brought to the junction box 30.

Instead of the molded retaining means 145, 150 attached to the face plate 120 which retains the communications attachment device 20 within the box 30 of FIG. 1, the communications attachment device 550 of FIG. 6 has an annular ring 575 which receives a first end 580 of a concave spring-retaining means 585 and a first end 590 of a second concave spring-retaining means 600. The two retaining springs 585 and 600 function essentially the same as the two retaining members 145, 150.

The first end 580, 590 of each the retaining members 585, 600, has a V-shaped clamp 605, 610 formed therein. The retaining clips 605, 610 are identical in a description of the clips 610 will suffice for both. The clip 610 has a first side 620 joined to a second side 625 such that the two sides mate at an acute angle with respect to one another. The spring clip 625 is attached to the end 590 by a member 630 joining the leg 620 to the first end 590. The V-shaped retaining clips 605, 610 receive the annular retaining ring 575 between the two sides, such as the sides 620, 625. The retaining ring 575 is removably affixed to an interior surface 635 of the face plate 555 by screws or any other similar arrangement. One leg of each of the retaining clips 605, 610, such as the leg 625, is clamped between the annular retaining ring 575 and the interior surface 635 of the face plate 555.

The face plate 555 also has a spacing edge or lip 640 essentially perpendicular to the interior surface 635. The lip 640 terminates in a perpendicular surface 645 which is located adjacent the front surface 62 of the wallboard 60. When the telecommunications attachment device 550 is to be installed in the box 30, the spring clips 585, 600 are bent inwardly slightly such that the clips will slide by the interior surfaces 215, 220 of the box 30 permitting axial movement with respect to the box 30 of the communications attachment device 555 until the edge 645 of the lip 640 of the active face plate 555 is located adjacent the front surface 62 of the wallboard 60. The spring clips 585, 600 retain the telecommunications attachment device 550 adjacent the surface 62 of the wallboard 60 due to the frictional forces between the box 30 and the spring clips 585, 600.

Figure 7:
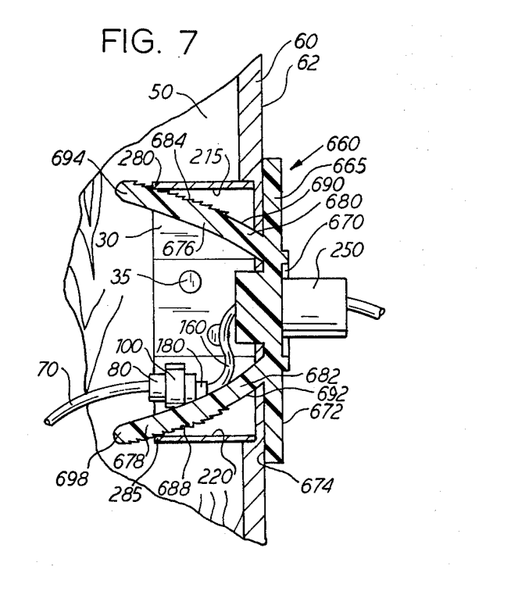
FIG. 7 is a section showing the relationships between a third alternate of the attachment structure, the wallboard and a junction box.

FIG. 7, a third alternate embodiment of a telecommunications attachment structure 660, has an active plate 665 with a centrally located outwardly oriented low-powered telecommunications socket 670. The active face plate 665 has a front planar surface 672 and a rear parallel planar surface 674. When installed in the box 30, a circumferential region of the rear planar surface 674 is located adjacent the surface 62 of the wallboard 60. The retaining means for the telecommunications attachment structure 660 comprises a pair of flexible molded leg members 676, 678 moldingly affixed to the active face plate 665 at a first end respectively 680, 682. The legs 676, 678 each have a set of outwardly extending teeth 684, 688. The sets of teeth 684, 688 are each located on an outwardly extending surface 690, 692 of the legs 676, 678, respectively. To properly insert the telecommunications attachment structure 660 into the box 30, an end 694, 698 respectively of each of the molded legs 676, 678 is bent inwardly so as to pass by the respective interior surfaces 215, 220, of the box 30. The outwardly oriented teeth 684, 688, slide over the ends 280, 285 of the box 30 as the telecommunications attachment apparatus 660 is being pushed toward the wallboard 60. An attempted removal of the telecommunications access device 660 causes members of the plurality of teeth 684, 688 to engage the rear edges 280, 285 of the box 30 thereby retaining the telecommunications access device 660 adjacent the front surface 62 of the wallboard 60.

Figures 8, 9, 10, 11:
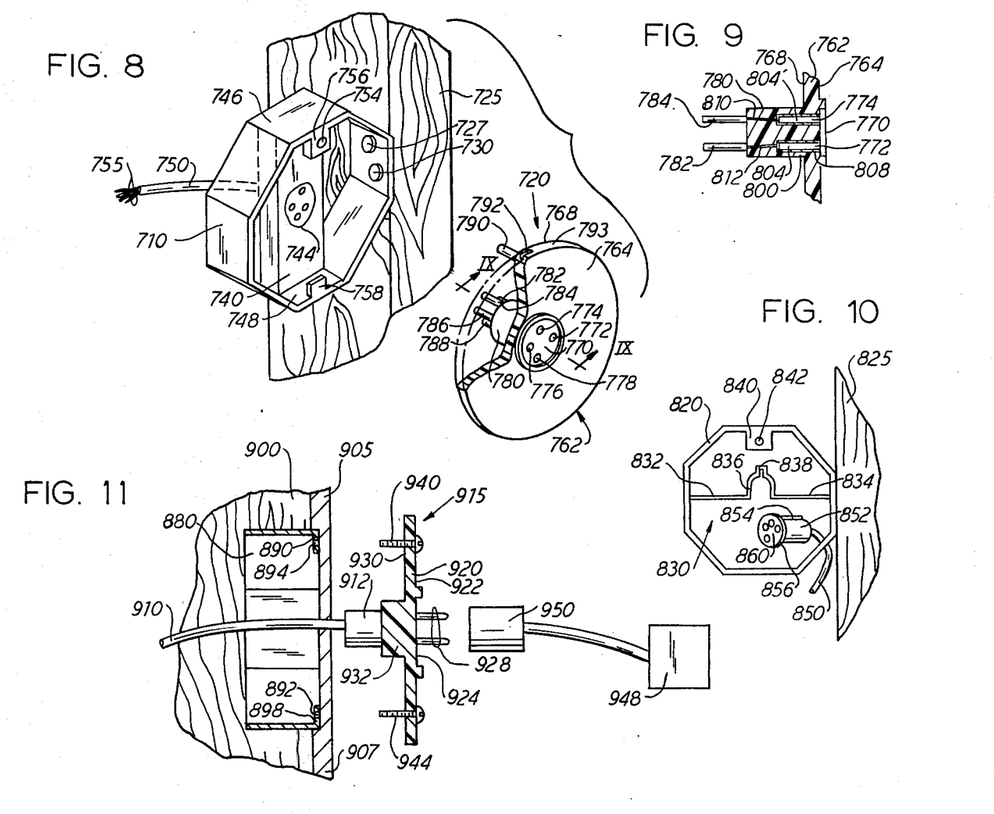
FIG. 8 is a perspective, with the wallboard completely broken away, showing a fourth alternate embodiment of the attachment structure and a compatible junction box.
FIG. 9, a section taken along line IX—IX of FIG. 8, shows the internal electrical detail of the attachment structure of FIG. 8.
FIG. 10 is a planar frontal view of an alternate junction box with the supporting wall member partially broken away.
FIG. 11 is a section view of yet another embodiment of the attachment structure of the present invention.

FIG. 8 is an alternate modular access apparatus with a junction box structure 710 and with a compatible telecommunications attachment structure 720. The junction box 710 is mounted behind the surface wall on a wall member 725 by a pair of screws or nails 727, 730. A channel-shaped member 740 having a keyed socket 744 is rigidly attached to a top member 746 and a bottom member 748 of the junction box 710. A telecommunications cable 750 having a selected number of conductors 755 is connected to the multi-conductor keyed socket 744. The box 710 additionally has an alignment aperture 754 located in a tab 756 attached to the top member 746. A supporting tab 758 is attached to the lower member 748 of the box 710.

The telecommunications attachment structure 720 of FIG. 8 has a circular active face plate 762 with a front planar surface 764 and a rear parallel planar surface 768. A second keyed low-power communications socket 770 is centrally located with respect to the face plate 762. The socket 770 has a series of selectively located socket terminations 772 through 778. A cylindrical molded plug 780 molded to the rear surface 768 of the active face plate 762 has a set of plug terminations or pins 782 through 788. The plug pins 782 through 788 are electrically connected to the socket terminations 772 through 778. The pins 782 through 788 have a physical configuration which makes them compatible with the first keyed socket 744 supported by the bracket 740 within the box 710.

A cylindrical stud 790 is affixed to the rear surface 768 of the active plate 762 and has a diameter such that it is compatible with the diameter of the keying hole 754 located in the tab 756 attached to the box 710. A prying slot 792 is located on an edge 793 of the active face plate 762 such that once the telecommunications access device 720 has been plugged into the first socket 744 a screw driver may be used in the prying slot 792 to pry the face plate 762 off of the adjacent wallboard.

FIG. 9, a section taken along line IX—IX of FIG. 8, discloses the interior structure of the plug 780. The cylindrical plug 780 is molded at a first end 800 to the rear surface 768 of the face plate 762. Each of the socket terminations 772, 774 of the centrally located telecommunications socket 770 comprises a hollow conductive socket member 804, 804' located in a boring 808 of the face plate 762 and extending into the plug 780. A pair of conductors 810, 812 electrically conducts the socket sleeves 804', 804 to the plug pins 784, 782.

The advantage of the telecommunications attachment structure 720 lies in the fact that there is no loose wire between the front facing telecommunications socket 770 and the rearward facing plug member 780 as was the case in the previous embodiments. The telecommunications attachment structure 720 may be used with the alternate junction box configuration of FIG. 10.

In FIG. 10 an alternate junction box 820 affixed to a wall member 825 has a bracket 830 with a first and a second horizontal member 832, 834 affixed to a U-shaped member 836 having a key slot 838. The junction box 820 also includes a tab 840 having an aperture 842 corresponding to the tab and aperture 756, 754 of the junction box 710. An alternate telecommunications cable 850 having an attached keyed socket structure 852 is usable with the junction box 820. The socket structure 852 has an elongated rectangularly shaped key portion 854 suitable for engaging the key slot 838 of the bracket 830. The socket 852 also has a shoulder 856 located at an outwardly oriented end for the purpose of permitting the socket 852 to be pressed against and engage the U-shaped bracket 836. Adjacent the shoulder 856 is a set of multi-conductor socket terminations 860 having a selected physical orientation and spacing.

The telecommunications attachment structure 720 with the plug 780 and its associated pins 782 through 788 may be plugged directly into the keyed socket member 852 provided the multi-conductor socket termination 860 of the socket member 852 matches the physical configuration of the pins 782 through 788.

The modular access apparatus system comprising the telecommunications attachment structure 720 of FIG. 8, the junction box 820 of FIG. 10, the telecommunications cable 850 with the molded-on socket 852, comprises a very labor efficient in-wall wiring system usable for prefabricated construction. In such an instance, the cable 850 can be fabricated with the sockets 852 molded therein at preselected intervals and junction boxes, such as the box 820, can be spaced along the prefabricated walls corresponding to the spacing between cable sockets. The cable 850 may be located within the walls being prefabricated with the sockets, such as the socket 852, being located adjacent and within respective junction boxes, such as the junction box 820. When the wall is prewired, the sockets 852 may be mounted on the brackets 830. Until it is desired to activate a selected junction box, such as the junction box 820, a passive face plate, such as the face plate 300 of FIG. 3, may be used to cover the junction box 820. When desired, to activate the selected junction box, such as the box 820, the passive face plate may be removed and the telecommunications attachment structure 720 may be plugged into the box 820 and the socket 852 thereby providing a socket 770 located on the outer surface of the prefabricated wall into which the plug 250 associated with the selected telecommunications device 240 may be plugged. This process requires no tools and may be quickly accomplished by untrained personnel.

FIG. 11 shows a final alternate embodiment with a junction box 880 having a pair of frontally oriented tabs 890, 892. Each of the tabs 890, 892 has a boring 894, 898 therethrough. The box 880 is mounted on a wall member 900 adjacent a piece of wallboard 905 and recessed with respect to a front surface 907 of the wallboard 905. A telecommunications cable 910 is brought to the box 880 and has attached thereto a multi-conductor plug or socket 912. A telecommunications attachment structure 915 having an active face plate 920 with an outwardly oriented surface 922 and with a centrally located low-power communications plug 924. The plug 924 has a plurality of outward extending conducting pins as shown by the group element 928. Attached to a rear planar surface 930 of the active face plate 920 is a cylindrical multiconductor socket or plug member 932 capable of receiving the telecommunications plug or socket 912. The telecommunications attachment structure 915 is affixed to the box 880 by a pair of screws 940, 944 which engage the respective borings 894, 898 in the tabs 890, 892. A telecommunications device 948 may be connected to the telecommunications cable 910 in the wall by a plug 950 which can receive the pin members 928 on the active face plate 920.

It should be noted that the in-wall sockets, such as the socket 80, might have the same physical configuration as the external telecommunications sockets, such as the socket 130.

While various modifications and changes might be suggested by those skilled in the art, it will be understood that I wish to embody within the claims of the patent warranted hereon all such changes and modifications as reasonably come within my contribution to the art.

I claim as my invention:

1. A modular communication access apparatus to attach a selected telecommunication device to a telecommunication line, having at least two conductors, which has been brought to a junction box mounted in a supporting wall, the apparatus comprising:

a first keyed socket having a plurality of socket terminations, of a first selected shape and size each operatively attached to one of the conductors in the telecommunications cable;

a mechanical support member having a body portion and an attachment portion, said body portion being capable of receiving and clamping said first keyed socket and said attachment portion being rigidly affixable to an interior region of the junction box mounted in the wall;

an attachment structure having;
  a face plate; and, an outwardly oriented second keyed, socket, affixed to said face plate, said second keyed socket having a selected number of socket terminations of a selected size and shape different from said selected size and shape of said socket terminations of said first socket; and
  a low power telecommunications wire of a selected length and a selected number of conductors, said selected number of conductors of said low-power telecommunications wire being operatively connected, at a first end, to said selected number of said socket terminations in said second keyed socket in said face plate; said selected number of conductors of said low-power telecommunications wire being connected, at a second end, to a selected set of plug terminations in a keyed plug of a selected body size and shape; and
  a face plate retaining means attached to said face plate and operative to removably affix said attachment structure to the junction box mounted in the wall;

said body of said keyed plug being removably insertable into said first keyed socket with said plug terminations conductively engaging said socket terminations of said first keyed socket so as to provide a selected number of electrical paths between the telecommunications cable within the junction box, said low-power telecommunications wire and said selected number of socket terminations in said outwardly oriented second socket in order that a selected telecommunications device may be plug-connected thereto and access the telecommunications line in the box.

2. A modular telecommunication access apparatus for the purpose of attaching a selected telecommunications device to a telecommunication line, having at least two conductors, which has been brought to a junction box mounted in a wall, the apparatus comprising:

a first keyed multi-conductor socket having a selected number of socket terminations of a first selected size and shape, each operatively connectable to one conductor in the telecommunications cable such that each said connection between each said socket termination and the respective conductor in the communications cable is suitable for reliably conducting low power communications signals therebetween;

a unitized attachment structure having a face plate with an outwardly oriented keyed telecommunications socket of a second selected size and shape into which the selected telecommunications device may be plugged;

said telecommunications socket having a selected number of telecommunications socket terminations;

a low-power electrical connection means of a selected length and a selected number of conductors, said selected number of conductors of said low-power connection means being operatively connected, at a first end, to said selected number of said telecommunications socket terminations in said telecommunications socket in said face plate;

said selected number of conductors of said low-power electrical conduction means being formed, at a second end, to a keyed plug of a selected body size and shape;

a face plate retaining means attached to said face plate and operative to removably affix said attachment structure to the wall-mounted box;

said body of said keyed plug being removably insertable into said first keyed socket with only one orientation so as to provide a selected number of electrical connections between the telecommunications cable within the junction box, said low power electrical connection means and said selected number of telecommunications socket terminations in said outwardly oriented keyed telecommunications socket in order that a selected telecommunications device may be plug-connected thereto and access the telecommunication line in the box.

3. A modular apparatus capable of providing a rapid connection to a pre-wired low power communications cable, having a plurality of conductors, brought to a junction box, mounted in a wall the apparatus comprising:

a first keyed, multiconductor, self-contained electrical connection means, connectable to selected members of the plurality of conductors of the communications cable located within the junction box such that each said connection between each said conductor in said electrical connection means and the respective conductor in the communications cable is suitable for reliably conducting low power communications signals therebetween;

a unitized attachment structure having a face plate, an inwardly oriented, keyed second electrical connection means having a first plurality of contacts, operatively attached to an interior side of said face plate, an outwardly oriented, keyed third electrical connection means having a second plurality of contacts, operatively connected to a front side of said face plate;

selected members of said first plurality of contacts being electrically connected to selected members of said second plurality of contacts;

said first and said second keyed electrical connection means being slidably engageable with only one orientation so as to provide a rapidly connectable set of parallel, low power, electrically conducting paths between the selected members of the plurality of conductors of the communications cable and said selected members of said second plurality of contacts in said third electrical connection means, a selected communications device being plug connectable to said second plurality of contacts of said third electrical connection means to access the communications cable.

4. The apparatus according to claim 3 including further, an attachment means affixed to said face plate cooperative with the junction box mounted in the wall to retain said attachment structure substantially adjacent to a front surface of the junction box.

5. In a pre-wired low power communications system having a plurality of wall mounted junction boxes, each with an access aperture a selected distance from a front surface of the adjacent wall, interconnected by a low power communications cable having a selected number of conductors, a connection apparatus, for the purpose of converting selected, passive, junction boxes each covered by a passive face plate blocking access to the communications cable in the respective junction box, to active junction boxes in order to connect selected communications devices into the communications system, the connection apparatus comprising:

a plurality of first keyed, low power multi-connector sockets, each having a first selected shape with a selected socket configuration including a first set of selectively arranged socket contacts, said contacts of each said socket are connectable to selected conductors in the low-power cable at selected intervals along the cable before or after the cable is installed in the wall and each said socket is locatable within a respective wall-mounted box;

a plurality of unitized, modular access devices each comprising:

an active plate of a size and shape corresponding substantially to the size and shape of each of the passive faced plates;

an outwardly oriented, second, keyed, low-power multi-conductor communications socket centrally located on an outwardly oriented surface of said active face plate with a set of socket contacts having a selected arrangement different from said first set of socket contacts;

an inwardly oriented, keyed multi-conductor low-power commmunications plug of a selected shape and configuration including a set of selectively arranged plug contacts;

an electrical connection means affixed to an inwardly oriented surface of said active face plate with said electrical connection means operable to electrically connect selected ones of said conductors of said second multi-conductor socket to selected ones of said plug contacts of said multi-conductor plug;

said keyed, low power communications plug being receivable by a said one of said first, keyed, low power multi-conductor, sockets located within a selected member of the plurality of junction boxes with said plug contacts engaging said socket contacts of said first, keyed, socket, so as to operatively electrically connect selected members of the selected number of conductors in the low-power communications cable to selected conductors of said second multi-conductor communications socket so as to permit a selected communications device, plugged into said second communications, socket, to access the communication system through the respective active junction box;

whereby a passive junction box can be converted to an active junction box by removing the associated passive face plate and connecting said keyed plug to a said first keyed socket located within the junction box.

6. The connection apparatus according to claim 5 having further an attachment means affixed to said active face plate, said attachment means cooperating with the selected junction box to retain said modular access device adjacent the junction box.

7. The connection apparatus according to claim 6 wherein said attachment means comprises:
a first and a second elongated member each attached at a first end to said inwardly oriented surface of said active face plate and said first and second members each cooperating with the respective junction box to retain said modular access device adjacent the box.

8. The connection apparatus according to claim 6 wherein each of said first, keyed low-power multi-conductor sockets comprises:
an elongated body portion with an interior boring partially therethrough, a key slot selectively located on said interior boring with said set of selectively arranged socket contacts being located adjacent said interior boring, with each of said socket contacts electrically connected to a selected conductor in the telecommunications cable.

9. The connection apparatus according to claim 5 wherein said electrical connection means comprises:
a rigid cylindrical structure rigidly attached at a first end to said inwardly oriented surface of said face plate with said low-power communications plug rigidly affixed to a second end thereof and including a set of electrical conductors encapsulated within said rigid cylindrical structure and operative to connect selected ones of said plug contacts to selected ones of said contacts in said second, outwardly oriented, communications socket.

10. In a pre-wired low power communications system having a plurality of wall mounted junction boxes, each with an access aperture a selected distance from a front surface of the adjacent wall, interconnected by a low power communications cable having a selected number of conductors, a connection apparatus, for the purpose of converting selected, passive, junction boxes each covered by a passive face plate blocking access to the telecommunications cable in the respective junction box, to active junction boxes in order to connect selected communications devices into the communications system, the connection apparatus comprising:
a plurality of first keyed, low power multi-conductor sockets, each having a first selected shape with a selected socket configuration including a first set of selectively arranged socket contacts attachable to selected conductors in the low-power telecommunications cable at selected intervals and each locatable within a respective wall-mounted box;
a plurality of modular access devices each comprising:
an active plate of a size and shape corresponding substantially to the size and shape of each of the passive face plates;
an outwardly oriented, second, keyed, low-power multi-conductor communications socket centrally located on an outwardly oriented surface of said active face plate with a set of socket contacts having a selected arrangement different from said first set of socket contacts;
an inwardly oriented, keyed multi-conductor low-power communications plug of a selected shape and configuration including a set of selectively arranged plug contacts;
an electrical connection means affixed to an inwardly oriented surface of said active face plate with said electrical connection means operable to electrically connect selected ones of said conductors of said second multiconductor socket to selected ones of said plug contacts of said multi-conductor plug;
said keyed, low power communications plug being receivable by a said one of said first, keyed, low power multiconductor, sockets located within a selected member of the plurality of junction boxes with said plug contacts engaging said socket contacts of said first, keyed socket, so as to operatively electrically connect selected members of the selected number of conductors in the low-power communications cable to selected conductors of said multiconductor communications socket so as to permit a selected communications device, plugged into said second communications socket, to access the communication system through the respective active junction box;
whereby a passive junction box can be converted to an active junction box by removing the associated passive face plate and connecting said keyed plug to said keyed socket attached to the communication cable;
an attachment means affixed to said active face plate, said attachment means cooperating with the selected junction box to retain said modular access device adjacent the junction box;
said attachment means comprises a first and a second concave, elongated, spring member each attached at a first end to said inwardly oriented surface of said active face plate.

11. The connection apparatus according to claim 10 wherein each of said elongated spring members has a V-shaped portion at said first end;
an annular ring of a selected diameter affixed to said inwardly oriented surface of said active face plate and operative to receive said V-shaped portion of each of said spring members and cooperative with said inwardly oriented surface to lockingly retain each said spring member with an orientation substantially perpendicular to said inwardly oriented surface.

12. A modular communication access apparatus to attach a selected telecommunication device to a telecommunication line, having at least two conductors, which has been brought to a junction box mounted in a supporting wall, the apparatus comprising:
a first keyed socket having a plurality of socket terminations of a selected size and shape, each said socket termination is operatively attachable to a selected one of the conductors in the telecommunications line before the line is intalled in the wall; and
a one-piece attachment structure having;
a face plate; and, an outwardly oriented second keyed, socket, affixed to said face plate, said second keyed socket having a selected number of socket terminations of a selected size and shape;
a selected number of low power conductors, said selected number of conductors being operatively connected, at a first end, to said selected number of said socket terminations in said second keyed socket in said face plate, and at a second end, to a selected set of plug terminations in a keyed plug of a selected body size and shape; and a face plate retaining means attached to said face plate and operative to removably affix said attachment structure to the junction box mounted in the wall;

said body of said keyed plug being removably insertable into said first keyed socket with said plug terminations conductively engaging said socket terminations of said first keyed socket so as to provide a selected number of electrical paths between the telecommunications line and said first keyed socket within the junction box and said selected number of socket terminations in said outwardly oriented second socket in order that a selected telecommunications device may be plug-connected thereto and access the telecommunications line in the box.

13. The modular communications apparatus according to claim 12 wherein:

said plurality of socket terminations in said first keyed socket has a first selected size and shape and, said selected number of socket terminations of said second keyed socket have a second selected size and shape, with said first size and shape being different from said second size and shape.

14. A modular communication access apparatus to attach a selected telecommunication device to a telecommunication cable, having at least two conductors, which has been brought to a junction box, the apparatus comprising:

a first self-contained, keyed, socket with a first plurality of selectively arranged, adjacent socket terminations connectable to selected conductors in the telecommunication cable before the cable is installed, said connections between said socket terminations and the selected conductors are adapted to reliably transmit low power communication signals therebetween;

an attachment structure having a face plate, a second keyed socket with a second plurality of selectively arranged socket terminations attached to said face plate and accessible at a first surface of said face plate;

means for connection attached to a second surface of said face plate, and means for connection includes a plurality of selectively arranged, adjacent, plug terminations corresponding to said arrangement of said socket terminations of said first socket, each of said plug terminations of said means for connection is electrically connected to a selected one of said socket terminations of said second socket, and said means for connection is removably insertable, with only a selected orientation, into said first keyed socket and said plug terminations conductively engage said socket terminations of said first socket so as to provide a selected number of electrical paths between selected conductors in the telecommunications cable within the junction box, and said socket terminations in said second socket in order that a plug attached to a selected telecommunications device may be inserted, with only a selected orientation into said second keyed socket and be connected to the selected conductors in the telecommunication cable.

15. The telecommunications access apparatus according to claim 14 wherein said first socket is a substantially cylindrical keyed socket adapted to be attached to the telecommunication cable before the cable is installed and further adapted to extend into the junction box through an opening in the rear thereof.

16. The telecommunications access apparatus according to claim 15 wherein:

said means for connection includes a cylindrical, insulating, member attached to said second surface at a first planar end and from which said adjacent plug terminations extend at a second planar end.

17. A modular communication access apparatus to attach a selected communication device to a communication line, having at least two conductors, which has been brought to a junction box mounted in a supporting wall, the apparatus comprising:

a first keyed socket with a unitized self-contained housing which supports a plurality of socket terminations, of a first selected shape and size, each said socket termination is connectable to one of the conductors in the communications cable before the cable is installed and said housing is then insertable into the junction box through an opening therein;

a mechanical support member adapted to receive and clamp said first keyed socket to an interior region of the junction box mounted in the wall; and unitized attachment means having;

a face plate and an outwardly oriented second, keyed socket affixed to said face plate, said second keyed socket having a selected number of socket terminations of a selected size and shape different from said selected size and shape of said socket terminations of said first socket; and a low power means for electrical connection of a selected length with a selected number of conductors, each said selected conductor of said low-power means for electrical connection is connected, at a first end, to a selected one of said socket terminations in said second keyed socket in said face plate; said selected conductors of said low-power means for electrical connection are connected, at a second end, to a selected set of plug terminations in a keyed plug of a selected body size and shape;

said body of said keyed plug being removably insertable into said first keyed socket with said plug terminations conductively engaging said socket terminations of said first keyed socket so as to provide a selected number of electrical paths between the communications cable within the junction box and said selected number of socket terminations in said outwardly oriented second socket in order that a selected communications device may be plug-connected thereto and access the communications line in the box.

18. A modular communication access apparatus to attach a selected communication device to a communication line, having at least two conductors, which has been brought to a junction box mounted in a supporting wall, the apparatus comprising:

a first keyed socket with a substantially enclosed self-contained housing which supports a plurality of socket terminations, of a first selected shape and size, each said socket termination is connectable to one of the conductors in the communications cable such that each said connection between each said socket termination and the respective conductor in the communications cable is suitable for reliably conducting low power communications signals therebetween;

a mechanical support member adapted to support said first socket within an interior region of the junction box mounted in the wall; and unitized attachment means having;

a face plate and an outwardly oriented second, keyed, socket affixed to said face plate, said second keyed socket having a selected number of socket terminations of a selected size and shape different from said selected size and shape of said socket terminations of said first socket; and a selected set of plug terminations in a keyed plug of a selected body size and shape, each said plug termination in said keyed plug is electrically connected to a respective one of said socket terminations in said second keyed socket;

said body of said keyed plug is removably insertable into said first keyed socket with only one orientation such that said plug terminations conductively engage said socket terminations of said first keyed socket so as to provide a selected number of electrical paths between the communications cable within the junction box and said selected number of socket terminations in said outwardly oriented second socket in order that a selected communications device may be plug-connected thereto and access the communications line in the box.

19. The modular communication access apparatus according to claim 18, wherein said first keyed socket is adapted to be attached to the communications cable before the cable is installed.

* * * * *

UNITED STATES PATENT AND TRADEMARK OFFICE
CERTIFICATE OF CORRECTION

PATENT NO. : 4,273,957
DATED : June 16, 1981
INVENTOR(S) : William J. Kolling, Jr.

It is certified that error appears in the above—identified patent and that said Letters Patent is hereby corrected as shown below:

Column 1, line 33, erase "representation" and substitute -- representative --.

Column 2, line 12, change "phases" to --phase--.

Column 13, claim 7, line 20, after "plate" delete the word "and".

Signed and Sealed this

Third Day of August 1982

[SEAL]

Attest:

Attesting Officer

GERALD J. MOSSINGHOFF

Commissioner of Patents and Trademarks